W. Bunce,
Clasp for Elastic Tubes.

No. 113,016.  Patented Mar. 28, 1871.

Witnesses:
T. C. Brecht.
Geo. W. Fitts.

Inventor:
William Bunce

United States Patent Office.

WILLIAM BUNCE, OF OBERLIN, OHIO.

Letters Patent No. 113,016, dated March 28, 1871.

IMPROVEMENT IN REGULATING CLASPS FOR ELASTIC TUBES.

The Schedule referred to in these Letters Patent and making part of the same.

I, WILLIAM BUNCE, of the village of Oberlin, in the county of Lorain and State of Ohio, have invented certain Improvements in a Clasp or Valve for regulating the flow of fluid through an elastic or flexible tube or pipe, of which the following is a specification.

My invention consists in a clasp so formed that its application to a rubber or any elastic tube or pipe will regulate the flow of any fluid passing through the same; that is, by operating this clasp by the hand or otherwise, the fluid is permitted to flow, but when not so acted upon it is self-acting upon the tube or pipe, and stops the flow of the fluid through the same. This clasp may be used for various purposes, such as regulating the flow of water through a hose-pipe when used for washing windows, carriages, sidewalks, buildings, sprinkling streets, watering gardens; also, upon the same when used in extinguishing fires, and many other places where such a clasp may be used and is desirable for regulating the flow of fluids through such a tube or pipe.

General Description.

A is the clasp. This clasp may be formed of wood, metal, or vulcanized rubber, and is made round, or of any convenient form, and of sufficient size to admit a circular aperture in the center, of suitable diameter to inclose the elastic tube or pipe B, fig. 1, which it is intended to clasp. The clasp thus formed is divided lengthwise through the center, making two parts or halves; these halves are beveled or chamfered off from the middle toward the ends, as at D and E, fig. 2, leaving a central fulcrum or pivot in the middle, as at F, fig. 1; they are then placed with their internal surfaces together, surrounding the tube, and resting upon this pivot or fulcrum, as seen in fig. 1, and are held together by a band, as at H, fig. 2, passing around the middle and external surface of the clasp in the groove formed for its reception.

Figure 1:
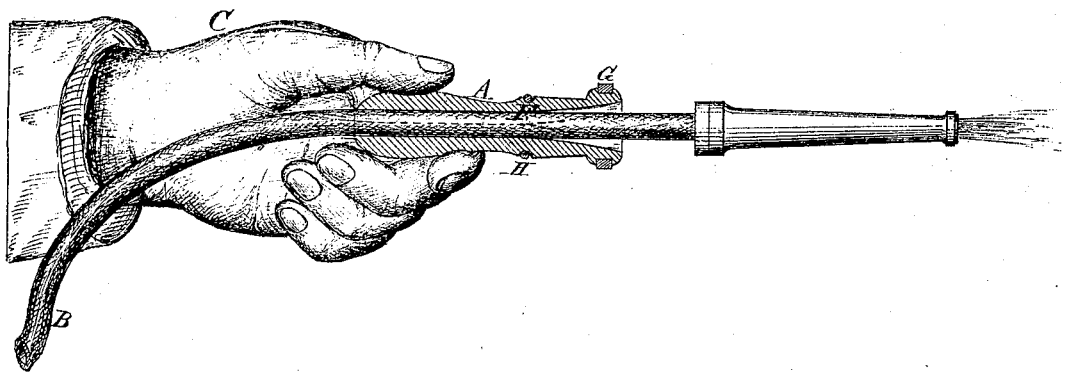
Figure 1 is a sectional view of the clasp, when attached to the tube or pipe, showing the different parts of the same.
Figure 2:
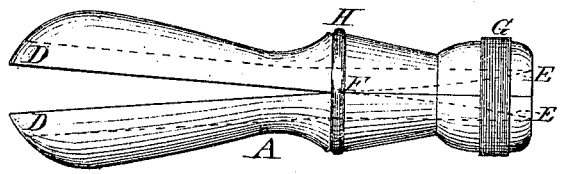
Figures 2 and 3 represent a side and end view, respectively, of the same.
Figure 3:
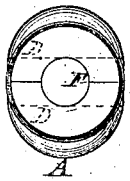

Around one end is placed an elastic band, as at G, figs. 1 and 2; this band forces this end of the halves of the clasp close together upon the tube B, fig. 1, thus closing this end tight upon the tube, and preventing the passage of any fluid through the same, and at the same time, by means of the fulcrum F, opening the opposite ends of the clasp, by passing these latter ends together with the hand or otherwise, as at c, fig. 1, the ends surrounded by the elastic band G are thrown open, permitting the immediate flow of the fluid; by relaxing this pressure, the opposite ends of the clasp closes upon the tube or pipe, thus adjusting the flow of the fluid, as the pressure is relaxed or applied.

Having thus described my invention,
What I claim, and desire to secure by Letters Patent, is the following—

Claim.

I claim—
A hollow clasp, with a central fulcrum, in combination with an elastic band, constructed and applied substantially as and for the purposes described and set forth.

WILLIAM BUNCE.

Witnesses:
GEO. W. FITTS,
R. H. MARSH.